US005972545A

United States Patent [19]

[11] Patent Number: 5,972,545
[45] Date of Patent: Oct. 26, 1999

Eid et al.

[54] METHOD OF PRINTING A COLOR FILTER

[75] Inventors: Bernard Eid, La Grande-Paroisse, France; Ronald E. Johnson, Tioga, Pa.

[73] Assignee: Corning Incorporated, Corning, N.Y.

[21] Appl. No.: 08/873,508

[22] Filed: Jun. 12, 1997

Related U.S. Application Data

[63] Continuation of application No. 08/623,430, Mar. 28, 1996, abandoned, which is a continuation-in-part of application No. 08/324,345, Oct. 17, 1994, Pat. No. 5,514,503, and application No. 08/499,982, Jul. 10, 1995, Pat. No. 5,624,775, and application No. 08/197,141, Feb. 16, 1994, Pat. No. 5,544,582, which is a continuation-in-part of application No. 08/145,155, Nov. 3, 1993, Pat. No. 5,535,673, and application No. 08/145,244, Nov. 19, 1993, Pat. No. 5,533,447.

[51] Int. Cl.[6] .......................... G02B 5/20; G02F 1/1335

[52] U.S. Cl. .......................... 430/7; 427/164; 427/165; 427/511; 101/211; 101/170; 101/483; 101/34

[58] Field of Search .......................... 430/7; 427/164, 427/165, 511; 101/211, 170, 483, 34

[56] References Cited

U.S. PATENT DOCUMENTS

| | | | |
|---|---|---|---|
| 4,035,214 | 7/1977 | Shuppert et al. | 156/240 |
| 4,362,806 | 12/1982 | Whitmore | 430/7 |
| 4,445,432 | 5/1984 | Ford et al. | 101/152 |
| 4,549,928 | 10/1985 | Blanding et al. | 156/660 |
| 5,127,330 | 7/1992 | Okazaki et al. | 101/450 |
| 5,500,750 | 3/1996 | Kanbe et al. | 349/42 |
| 5,514,503 | 5/1996 | Evans et al. | 430/7 |
| 5,533,447 | 7/1996 | Johnson et al. | 101/211 |
| 5,535,673 | 7/1996 | Bocko et al. | 101/211 |
| 5,540,147 | 7/1996 | Johnson | 101/211 |
| 5,544,582 | 8/1996 | Bocko et al. | 101/211 |
| 5,609,943 | 3/1997 | DeKoven | 428/195 |
| 5,624,775 | 4/1997 | Carre et al. | 430/7 |

FOREIGN PATENT DOCUMENTS

| | | |
|---|---|---|
| 61-284441 | 12/1986 | Japan . |
| 62-280804 | 12/1987 | Japan . |
| 62-280805 | 12/1987 | Japan . |
| 2-176704 | 7/1990 | Japan . |
| 3-231702 | 10/1991 | Japan . |
| 4-264503 | 9/1992 | Japan . |
| 4-321081 | 12/1992 | Japan . |
| 5-147359 | 6/1993 | Japan . |
| 6-167608 | 6/1994 | Japan . |

OTHER PUBLICATIONS

Translation of JP 3–231702, Ono, "Color Filter", Oct. 1991.
Katsuhiko Mizuno and Satoshi Okazaki, "Printing Color Filter for Active Matrix Liquid–Crystal Display Color Filter", Japanese Journal of applied Physics, vol. 30, No. 11B, Nov. 1991, pp. 3313–3317.
K. Ikiaki, "Low Cost Technology for Producing LCD Color Filters Transfer Print Method", Nikkei MI, vol./No. 58, Apr. 1990, pp. 83–87.

*Primary Examiner*—John A. McPherson
*Attorney, Agent, or Firm*—Angela N. Nwaneri; Maurice M. Klee; Robert L. Carlson

[57] ABSTRACT

A method for making color filters for liquid crystal display panels. A raised pattern corresponding to the desired black matrix pattern is formed on a substrate, e.g., by an embossing means. A plurality of colored ink patterns is formed in the appropriate location within the boundaries formed by the raised pattern, thereby forming the multicolor image that will become the color filter.

9 Claims, 6 Drawing Sheets

METHOD OF PRINTING A COLOR FILTER

This application is a continuation, of application Ser. No. 08/623,430, filed Mar. 28, 1996, now abandoned, which is a continuation-in-part of application Ser. No. 08/324,345, filed Oct. 17, 1994, now U.S. Pat. No. 5,514,503 and a continuation-in-part of U.S. patent application Ser. No. 08/499,982, filed Jul. 10, 1995, now U.S. Pat. No. 5,624, 775, and a continuation-in-part of U.S. patent application Ser. No. 08/197,141, filed Feb. 16, 1994, now U.S. Pat. No. 5,544,582, which is a continuation-in-part of Ser. No. 145, 155, Nov. 3, 1993, now U.S. Pat. No. 5,535,637, and a continuation-in-part of Ser No. 145,244, Nov. 3, 1993, now U.S. Pat. No. 5,533,447.

FIELD OF THE INVENTION

The invention relates to color filters for flat panel displays and methods for their production.

BACKGROUND OF THE INVENTION

Liquid crystal display (LCD) panels, particularly color LCD panels, are used for flat screen televisions, projection television systems and camcorder view finders, with many more applications anticipated in the future.

The fabrication of an active matrix liquid crystal display involves several steps. In one step, the front glass panel is prepared. This involves deposition of a color filter element onto a suitable substrate, such as glass. Color filter formation typically involves depositing a black matrix pattern and three primary (typically either red, green and blue or yellow, magenta and cyan) color dot or color cell patterns within the spaces outlined by the black matrix. The printed lines which form the black matrix typically are about 15–25 microns wide and about 0.5 to 2 microns thick. The red, green, and blue color cells are typically on the order of about 70–100 microns in width by 200 to 300 microns in length. The color cells are typically printed in films less than about 10 microns thick, and preferably less than 5 microns thick, and must be evenly applied and accurately registered within the pattern formed by the black matrix. The front glass substrate is typically completed by depositing a planarizing layer, a transparent conducting layer, and a polyimide alignment layer over the color filter element. The transparent conducting layer is typically indium tin oxide (ITO), although other materials can also be utilized.

In a second step, a separate (rear) glass panel is used for the formation of thin film transistors (TFT's) or diodes, as well as metal interconnect lines. Each transistor acts as an on-off switch for an individual color pixel in the display panel. The third and final step is the assembly of the two panels, including injection of a liquid crystal material between the two panels to form the liquid crystal panel.

One challenge to making the red, green and blue color pixel dots (also referred to as color cells) of the color filter is preventing the different colored inks from mixing with one another. In the past, this problem has been solved by first forming the black matrix pattern on a glass substrate (such as by photolithography) and then depositing the colors within the black matrix pattern.

It would be desirable to provide alternative methods for making color filters which have good resolution and registration, and which can be obtained easily and at a lower cost than prior art color filter arrays. It would also be desirable to achieve these qualities using a process which takes less steps than current processes.

SUMMARY OF THE INVENTION

In the present invention, a transparent raised pattern is formed on a color filter substrate, and the individual colored ink patterns that make up the color filter are deposited within the recesses formed by the transparent raised pattern. Preferably, the raised pattern is formed using mechanical forming techniques. However, other techniques, such as photolithography, could also be employed. By mechanical forming techniques, it is meant that the raised pattern is formed mechanically, such as by intaglio printing techniques, as opposed to photolithographic and other chemical forming techniques, wherein a portion of material is removed chemically during formation. The raised pattern preferably corresponds to a desired black matrix pattern. The colored ink is then deposited within the raised pattern, preferably utilizing typographic or other ink imaging pins which are smaller than the spaces formed by the raised pattern, to thereby facilitate deposition of the ink within the raised pattern without smearing or mixing the different ink colors.

In one embodiment a liquid transparent material is deposited within the recesses of an intaglio imaging surface, such as an intaglio roll or plate. Preferably, the recessed pattern of the intaglio imaging surface corresponds to a desired black matrix pattern. The transparent ink is hardened (e.g. by curing), preferably prior to or during deposition to the substrate, to precisely duplicate the shape of the intaglio recessed pattern. Ink in intaglio and gravure print plates typically has a negative meniscus, the surface of the ink in the recessed intaglio pattern curving below the print plate surface. Consequently, if necessary, an adhesive may be employed to remove the transparent material and apply it to the substrate. In such cases, the adhesive can be applied either to the transparent material or to the substrate. Alternatively, a positive meniscus can be provided, for example by employing ink jet or other imaging pins to overfill the recesses of the intaglio pattern. Preferably, the transparent material is liquid when it contacts the substrate, and the liquid transparent material is cured or otherwise hardened while in contact with the substrate to thereby remove the material from the recesses of the intaglio pattern.

In an alternative embodiment a transparent liquid material is deposited onto the substrate and the transparent material is contacted with an embossing pattern. The embossing pattern can likewise be provided on a roll or plate. Preferably, the liquid material is cured or hardened while being contacted by the intaglio pattern, so that the transparent material retains the shape of the intaglio pattern. Preferably, the embossing pattern on the roll or plate corresponds to a desired black matrix pattern so that after being embossed by the roller plate, the transparent material is left with a raised pattern corresponding to the black matrix pattern employed in the display.

After formation of the raised pattern, the colored ink which makes up the color filter pattern is deposited within the cells formed by the raised pattern. Ink printing methods are preferably employed to deposit the red, green and blue color cells within the recesses. The transparent raised pattern preferably is about 1 to 10 microns thick, more preferably about 2 to 6 microns thick, and most preferably about 3 to 4 microns thick (above the glass substrate). Preferably, the colored ink is deposited into the cells using ink imaging pins which have a smaller size than the cell size formed by the black matrix pattern.

The liquid transparent material may comprise, for example, polyimides, melamines, epoxides, acrylics, vinyl ethers, polyurethanes, polyesters, and acrylated or methacrylated acrylics, esters, urethane, epoxides and other materials which are conventionally useful as planarizing layers in conventional color filter devices, as well as combinations thereof. Preferably, the transparent material is formed of a radiation curable material so that it may be cured. A preferred material for the transparent material is a radiation curable acrylate material, such as a radiation curable epoxy acrylate.

The methods of the present invention enable the production of extremely accurate transparent raised patterns having well defined square edges. These transparent raised patterns facilitate separation of the materials used to form the color pixels of the color filter.

DETAILED DESCRIPTION OF THE INVENTION

Figure 1:
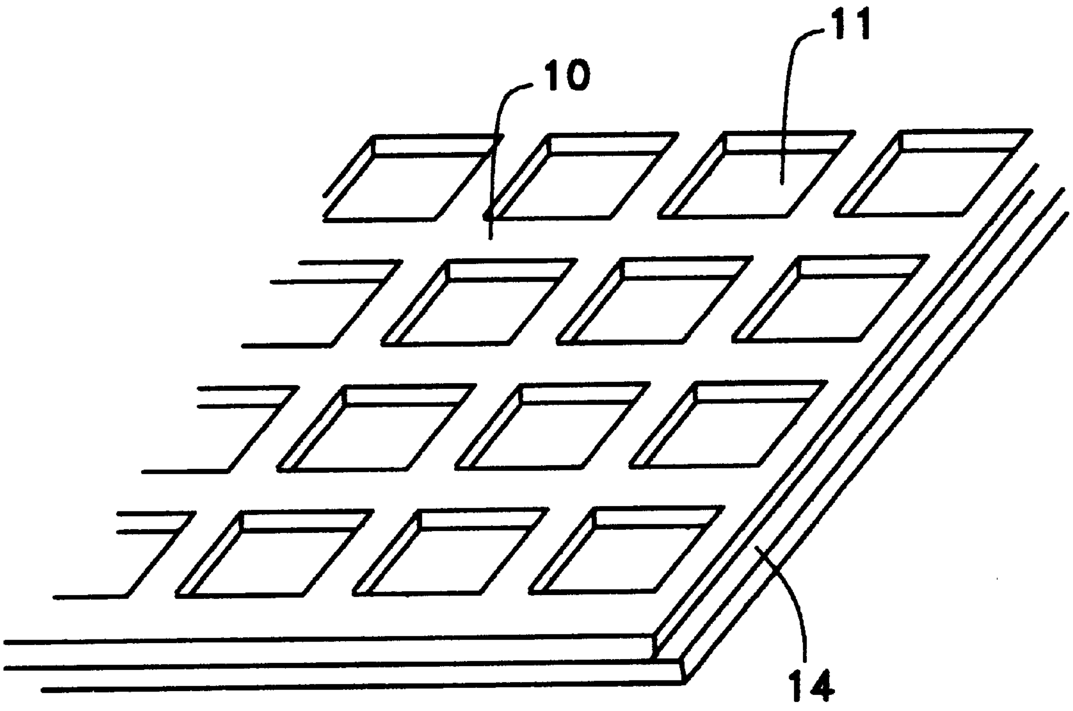
FIG. 1 illustrates a cross-section of a raised pattern formed using the method of the present invention.

In the present invention, as illustrated in FIG. 1, a transparent or semitransparent raised pattern 10 is formed on a substrate 14, and the individual colored ink patterns are then deposited within the recesses 11 formed by the raised pattern 10 to form a color filter pattern. Preferably, the raised pattern 10 is formed using mechanical forming techniques. By mechanical forming techniques, it is meant that the raised pattern is formed mechanically, such as by embossing or intaglio printing techniques, as opposed to photolithographic and other chemical forming techniques, wherein a portion of material is removed chemically during or after formation. However, the invention is not limited to mechanical forming, and other techniques, including photolithography, could be utilized in some embodiments to make the raised pattern.

Figure 2:
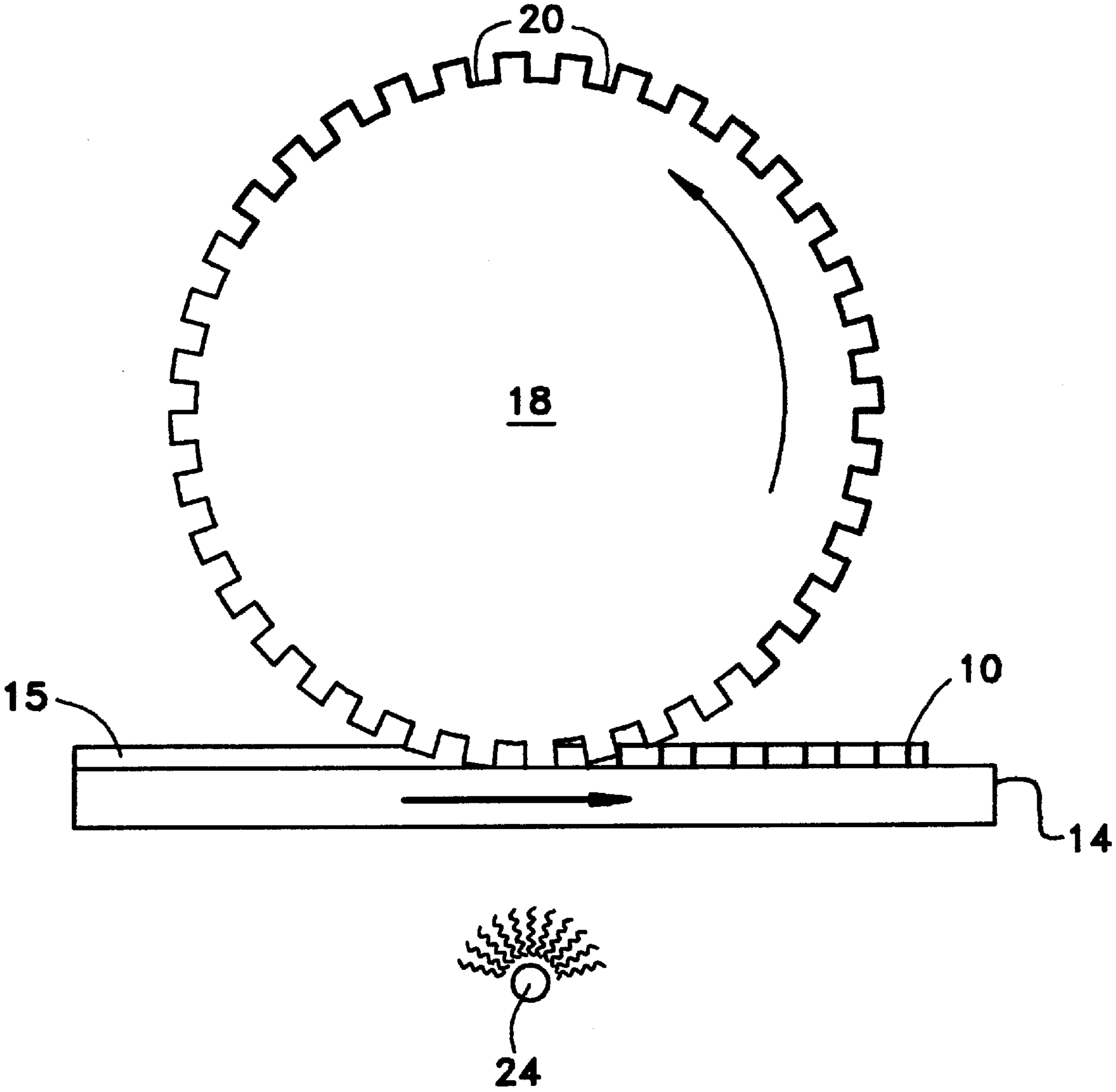
FIG. 2 illustrates the forming of a raised pattern in accordance with the present invention.

Raised pattern 10 can be formed using a variety of techniques. For example, in the embodiment illustrated in FIG. 2, a liquid transparent material 15 is deposited onto a suitable substrate 14, such as glass. The transparent material 15 is then embossed by an embossing means to form an upraised pattern on substrate 14. In FIG. 2, transparent material 15 is contacted by patterned intaglio roller 18 (with no ink thereon) while transparent material 15 is in a deformable state. Patterned intaglio roller 18 has a recessed pattern 20 thereon corresponding to the desired black matrix pattern. As a result, patterned intaglio roller 18 (which could alternatively be an intaglio plate) contacts and embosses the deformable transparent material 15 to form raised pattern 10. In a preferred embodiment, raised pattern 10 corresponds to the desired black matrix pattern to be employed in the display. Transparent material 15 is hardened sufficiently to retain the embossed pattern obtained by contact with roll 18. This can be accomplished by utilizing thermoplastic materials and cooling the transparent material, at the point of contact with roll 18, to set the ink. Alternatively, and more preferably, radiation curable materials are employed, and radiation is emitted from ultraviolet light 24 through substrate 14 to cure the transparent material 15 during the embossing operation.

Figure 3:
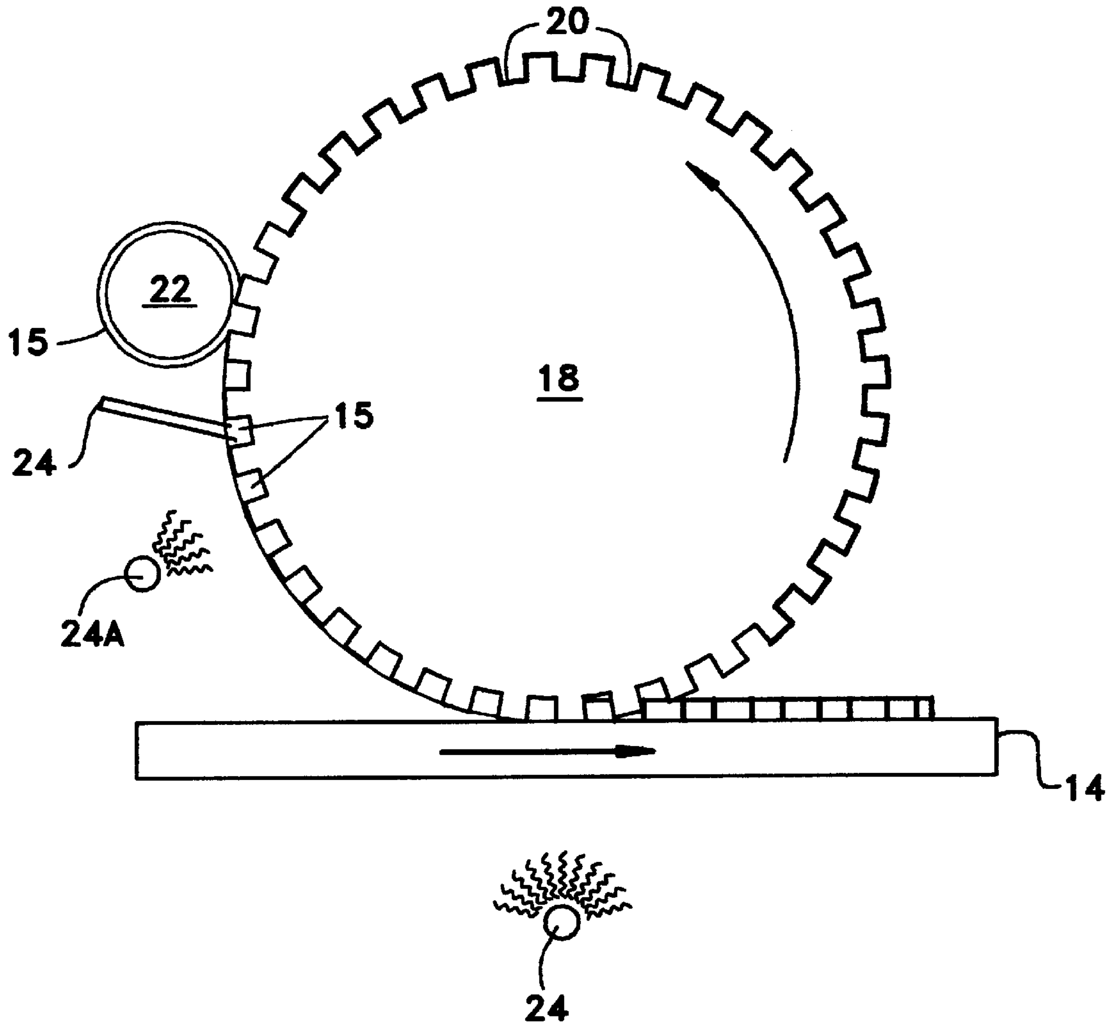
FIG. 3 illustrates an alternative method for forming a raised pattern in accordance with the present invention.

In an alternative embodiment, illustrated in FIG. 3, transparent material 15 is deposited from roll coater 22 into the recesses 20 of intaglio roll 18. Alternatively, transparent material 15 may be applied using slot coating techniques. After being deposited into recessed pattern 20 of intaglio roll 18, transparent material 15 is cured or otherwise hardened sufficiently so that the shape of recessed pattern 20 is retained by the material 15, and material 15 is transferred to substrate 14. In a preferred embodiment, radiation curable ink is employed for the transparent material 15, and the ink is hardened by curing the ink with radiation prior to or simultaneous with transfer to substrate 14. Most preferably, transparent material 15 is liquid prior to contacting the black matrix pattern, and cured during the transfer of the black matrix pattern to transparent material 15. Such curing may be accomplished by employing ultraviolet radiation curable material to form transparent material 15, and applying radiation, via ultraviolet (UV) light 24, for example, to transparent material 15 during deposition of the transparent material 15. Alternatively, a UV light could be mounted within roll 18, and roll 18 made of UV radiation transparent material to allow the radiation to be emitted therefrom. It should be noted that the radiation employed does not have to be ultraviolet, but could instead be visible, infrared, or other radiation, depending on the photoinitiator employed for the transparent material 15. Alternatively, transparent material 15 could be cured via UV light 24A prior to deposition to the substrate 14, and the deposition step achieved by using adhesives which are applied either to the substrate 14 or the transparent material 15.

Figure 4A:
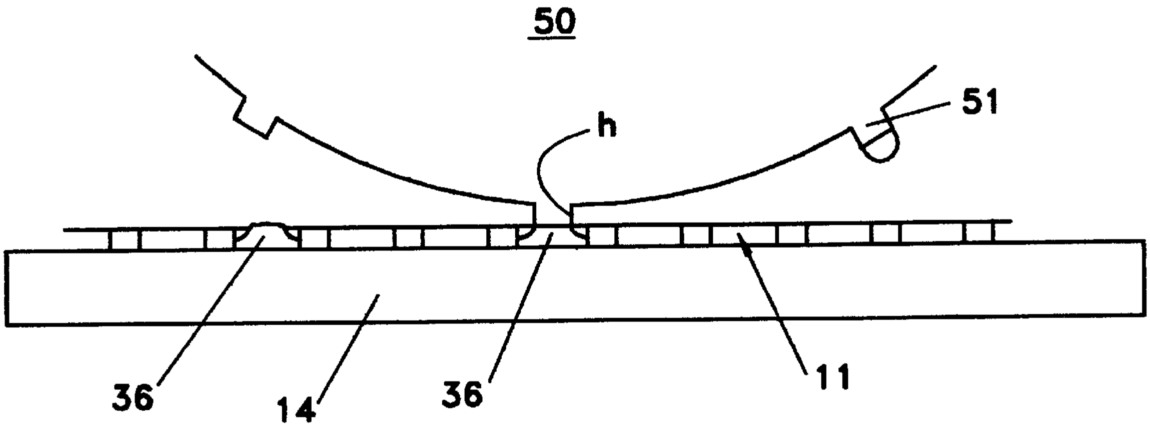
FIG. 4A illustrates the deposition of a colored ink from an imaging roll into the recesses of a raised pattern in accordance with the invention.
Figure 4B:
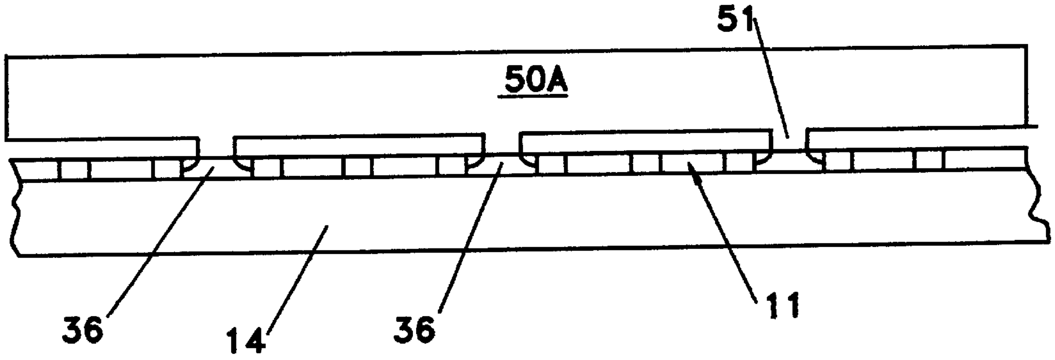
FIG. 4B illustrates the deposition of a colored ink from an imaging plate into the recesses of a raised pattern in accordance with the invention.

After formation of raised pattern 10, the various colored ink patterns are deposited within the recesses 11 formed by raised pattern 10 using a typographic ink imaging pattern, as illustrated in FIGS. 4A and 4B. The typographic ink imaging pattern can be supplied on a pattern roll 50, as illustrated in FIG. 4A, or on a pattern plate 50A, as illustrated in FIG. 4B. In FIGS. 4A and 4B, pattern roll 50 and pattern plate 50A, respectively, comprise a plurality of typographic ink imaging pins 51. However, the invention is not limited to the use of typographic imaging pins, and other imaging pins (e.g., ink jet) can be employed. The imaging pins 51 carry the colored ink 36 and deposit the ink within the recesses 11 formed by raised pattern 10. As can be seen in the illustration, the ink is preferably still fluid after deposition and may extend somewhat above the surface of the black matrix pattern.

Figure 4C:
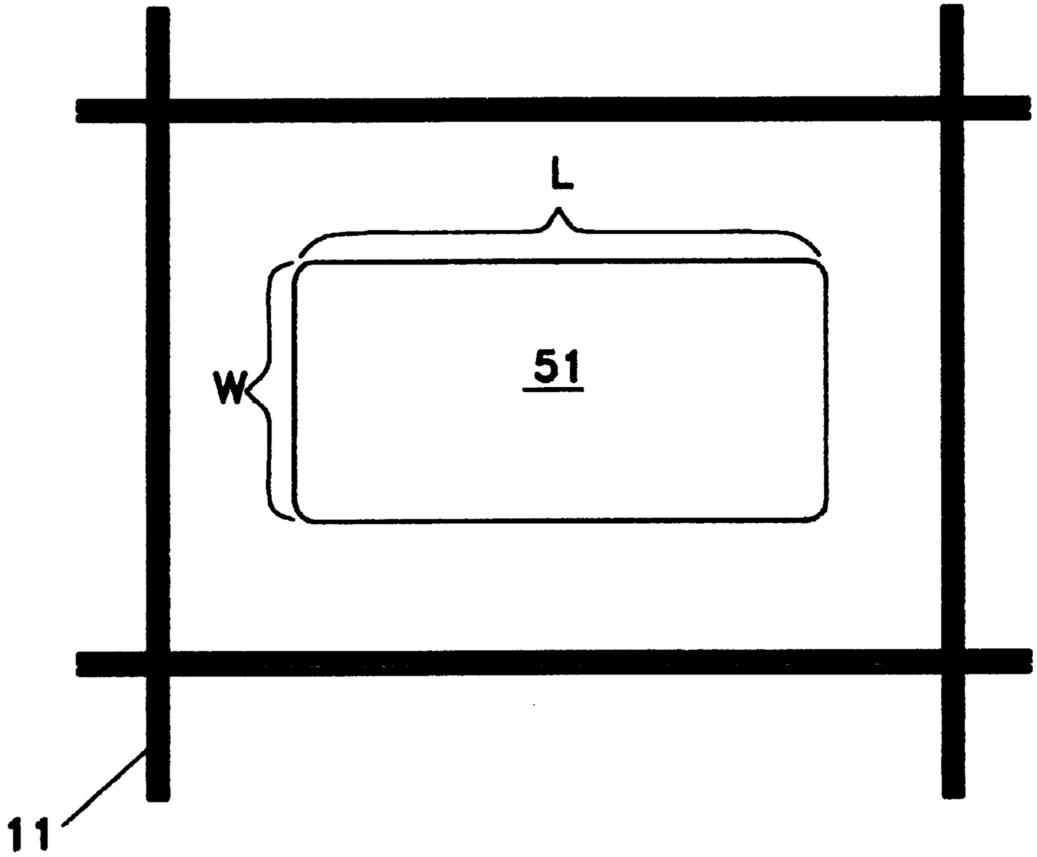
FIG. 4C is an enlarged partial top view of an imaging pin depositing ink into a raised pattern from an imaging roll or plate as illustrated in FIGS. 4A and 4B.

FIG. 4C illustrates a top view of the process illustrated in FIG. 4A, showing black matrix pattern 11 and typographic ink imaging pin 51 positioned within a cell formed by black matrix pattern 11 to deposit a color ink 36 therewithin.

Preferably, the colored ink is deposited into the cells using ink imaging pins which have a smaller size than the cell size formed by the black matrix pattern. For example, in a cell having dimensions of approximately 50 by 175 microns, the typographic ink imaging pin should have a dimension in which the width W is between 20 and 40 microns and the length L is between 140 and 160 microns. More preferably, the pin size has a width between 25 and 35 microns and a length between 145 and 155 microns. Most preferably, the pin has a width of about 30 microns and a length of about 150 microns. Thus, the width W of the pin is preferably between 10–30 microns smaller than the black matrix cell width, more preferably 15–25 microns smaller than the cell width and most preferably about 20 microns smaller than the cell width, whereas the length L of the pin should be between about 15–25 microns shorter than the cell length, more preferably about 20–30 microns shorter than the cell length, and most preferably about 25 microns shorter than the cell length. The height of the typographic pin is also important, and is closely related to the thickness of the ink on the inking roll which applies ink to the typographic pin. For example, in one process which utilizes typographic pins to deposit colored ink within black matrix cells having a dimension of about 50 by 175 microns, the inking thickness on the inking roll should be about 24 microns when using a pin approximately 30 microns wide by 150 microns long. Because it is desirable to have the typographic pin longer in height than the thickness of the ink on the inking roll, the height h of the imaging pins in such embodiments should be at least 30 microns, and more preferably at least 35 microns, and most preferably about 40 microns in height. Preferably, the pins are constructed so that the tops of the imaging pins are ink wetting, while the sides of the imaging pins are less or non-wetting to the inks.

In one embodiment, the imaging pins are porous imaging pins, and the ink is forced through the porous imaging pins. The imaging plate or roll could, for example, comprise a reservoir for containing the pixel ink behind the porous imaging plate, and the pixel ink selectively forced through the porous imaging pins of the imaging plate to apply ink to the printing surface of the imaging pins.

Figure 5:
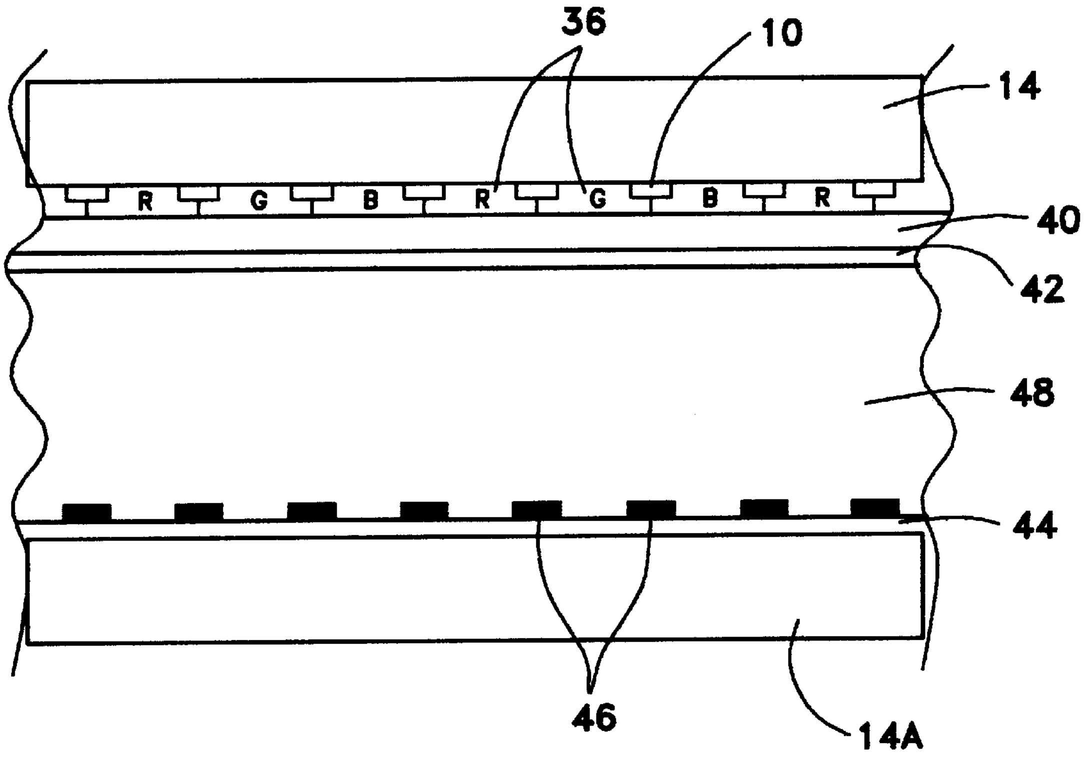
FIG. 5 is a liquid crystal display employing a raised pattern formed in accordance with the invention.

If desired, the colored pixel inks 36 and raised pattern 10 can be covered with a planarizing or protective layer 40, as illustrated in FIG. 5. The protective layer could be applied over the inks 36 and clear raised pattern 10 after the formation of these components, utilizing conventional coating techniques.

Forming the color filter pattern on a raised pattern facilitates separation of the different colored inks. This is extremely useful, for example, where it is desirable to employ a black matrix pattern separate from the color filter pattern. For example, in such cases, the colored inks could be employed on one component, and the black matrix pattern employed on a separate substrate, e.g. the other (TFT) glass substrate. If desired, the black matrix pattern can be deposited on top of the thin film transistor. For applications in which the black matrix pattern is deposited on the TFT substrate, it is believed that formation of the raised pattern 10 on transparent material 15 is very desirable, in order to separate and align the various red, green, and blue color cells with the black matrix pattern. By then registering the black matrix pattern 10 to align with raised pattern 10, when one looks down at the resultant liquid crystal display, the color cells will appear to be within the black matrix pattern.

In the embodiment illustrated in FIG. 5, a raised pattern 10 in accordance with the present invention is provided on first glass substrate 14. Raised pattern 10 separates the color pixel inks 36 from one another. Preferably, a planarizing layer 40 is deposited over the color pixels. Such planarizing layer 40 can be deposited using conventional techniques, e.g. roll coating, slot orifice coating, and so forth. An ITO electrode 42 is deposited over planarizing layer 40. On the second glass substrate 14*a*, a black matrix pattern 46 is provided on thin film transistor pattern 44. In the embodiment illustrated, black matrix pattern 46 comprises grid lines having a larger width than that of the raised pattern 10, thereby hiding the raised pattern 10 from the view of the consumer when the display is completed. However, other relative sizes could also be employed. The liquid crystal display in FIG. 5 is completed by sandwiching a liquid crystal material 48 between the two glass substrates 14 and 14*a*.

The transparent raised pattern 10 may be formed from, for example, those materials selected from the group consisting of polyimides, epoxides, melamines, acrylics, vinyl ethers, polyurethanes, polyesters, and acrylated or methacrylated acrylics, esters, urethane, or epoxides, and other materials which are conventionally useful as planarizing layers in conventional color filter devices. A preferred material for raised pattern 10 is a radiation curable acrylate material, such as a radiation curable acrylate. A particularly preferred material for raised pattern 10 is a radiation curable acrylate having the following composition (parts by weight):

TABLE I

| | |
|---|---|
| dipentaerythrital pentaacrylate | 50 |
| neopentyl glycol diacetate | 25 |
| isobornyl acrylate | 25 |
| cellulose acetate butyrate resin | 10 |
| silicone polyacrylate or epoxysilicones | 5 |

The silicone polyacrylate is believed to act as a non-wetting agent with respect to the colored pixel inks. This is considered a desired effect. The liquid transparent material 15 is preferably deposited as a thin film, typically less than 10 microns. Preferably, the transparent material is formed of a radiation curable material to facilitate curing.

Preferably, any apparatus used for carrying out the methods of the present invention is mounted on its side (i.e., vertically mounting the rolls). By vertically mounting the apparatus, they may be removed vertically (in an axial direction, relative to the roll) from the printing apparatus, as opposed to conventional horizontally disposed rollers, which must be removed horizontally.

For embodiments in which an ink (black matrix and/or color ink) is cured, the ink is preferably formulated to be radiation curable. By curable, it is meant that the ink cross-links. By radiation curable, it is meant that the ink cross-links when exposed to appropriate radiation. This is regardless of whether the ink also has hot melt thermoplastic properties in the uncured (uncross-linked) state or incorporates a solvent.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method of making a color array pattern for a flat panel display color filter, comprising:

printing a transparent raised pattern on a substrate, said raised pattern defining cell recesses, wherein said pattern is cured prior to or simultaneous with said printing onto said substrate; and depositing a plurality of colored inks into said recesses to form said color filter for a flat panel display, wherein said depositing step comprises depositing said colored inks using imaging pins having a smaller width and a smaller length than the width and length of said recesses.

2. The method of claim 1, wherein said depositing step comprises depositing said colored inks using typographic ink imaging pins having a width between 10–30 microns smaller than the cell recess width and a length between about 15–35 microns shorter than the cell recess length.

3. The method of claim 1 wherein said raised pattern in said printing step dimensionally corresponds to a desired black matrix pattern.

4. The method of claim 1, wherein said printing step comprises printing said raised pattern onto a glass substrate.

5. The method of claim 4, wherein said printing step comprises:

depositing transparent ink into a recessed imaging pattern; and transferring said ink from said recessed pattern to said substrate to form said transparent raised pattern.

6. The method of claim 5, wherein said depositing step comprises at least partially curing said transparent ink prior to said transferring said ink step.

7. The method of claim 5, wherein said transparent ink is cured during said transferring step.

8. The method of claim 5, wherein prior to said transferring step, an adhesive is applied either to said glass or said transparent ink.

9. The method of claim 1, further comprising: covering said colored inks with a protective or planarizing layer.

* * * * *